March 5, 1935. G. H. FRASER 1,992,942
AIR AND OTHER SEPARATORS
Filed June 9, 1930 2 Sheets-Sheet 1

Fig. 1.

INVENTOR
George H. Fraser

March 5, 1935. G. H. FRASER 1,992,942
AIR AND OTHER SEPARATORS
Filed June 9, 1930 2 Sheets-Sheet 2

Fig. 2.

INVENTOR
George H. Fraser

Patented Mar. 5, 1935

1,992,942

UNITED STATES PATENT OFFICE 1,992,942

AIR AND OTHER SEPARATORS

George H. Fraser, Brooklyn, N. Y.

Application June 9, 1930, Serial No. 459,930

45 Claims. (Cl. 209—139)

This invention relates to fluid current separators in which the current is used to separate fine from coarse material, and aims to provide improvements especially applicable to such devices.

Heretofore air separators have comprised a casing enclosing a chamber, a receptacle in said chamber having upper and lower openings communicating therewith, means for causing a current of air to flow up through said receptacle and upper opening into said chamber and return through said lower opening, and means for introducing pulverulent material into said current within said receptacle, to permit the current to float fine particles into said chamber as the coarser particles fall as tailings from said receptacle. The distributing means have been adjustable to vary their vertical distance from the upper opening, and current varying means have been provided, for the purpose of varying the fineness of the separated product. Means for intercepting particles floating in the returning current have been provided.

A rotary distributor for distribution of the material to be separated, and a rotary baffle wall adjacent the distributor for defining the space through which the separating current may flow, have been suspended by a vertically stationary bearing, as to which for varying separation they have been vertically adjusted by vertically stationary adjustment means revolving with them, a construction involving suspension of operation for adjusting them up and down to determine their vertical position suited to the fineness of separation desired, and requiring successive stoppages and adjustments and tests until the desired result has been obtained; to improve which my present invention provides vertically movable bearing means for such a distributor or baffle, vertically movable therewith, for rotatably suspending them, and for adjusting them up and down during their rotation, for effecting such adjustment during such rotation and without stoppage of operation, which vertically movable bearing means is preferably non-rotary, for facilitating vertical movement thereof with said distributor and baffle during rotation of the latter.

One example of former air separators is shown in my Patent No. 1,542,050 dated June 16, 1925 in which I have shown and claimed a vertically adjustable distributor suspended from a vertically stationary bearing and adjusted vertically by vertically stationary adjustment means revolving with the distributor, and as to which it is axially movable, as distinguished from my present vertically movable bearing vertically movable with the distributor and by which it is revolubly suspended; and in my said patent I have shown and claimed a rotary ring of circumferentially spaced horizontally extended uptossers around the distributor for upwardly impelling distributed material, as distinguished from the rotary ring of circumferentially spaced vertically extended baffle stirrers spaced from the distributor and depended downwardly across its zone of distribution for intercepting such material and horizontally deflecting it through the spaces between them, of my present invention.

Another example of an air separator is shown in my Patent No. 1,834,095 dated December 1, 1931, in which I have shown and claimed a vertically adjustable rotary baffle below and adjacent the upper outlet from a separating chamber and suspended from a vertically stationary bearing by a rotary suspension shaft relatively to which it is vertically adjusted by adjustment means revolving with it and requiring stoppage of operation for vertical adjustment of the baffle, as distinguished from the vertically movable non-rotary bearing, vertically movable with the baffle, for vertically adjusting it during operation, of my present invention; and in my said Patent No. 1,834,095 I have shown and claimed a ring of circumferentially spaced horizontally extended material uptossers below the distributor, for uptossing material falling below its zone of distribution, as distinguished from the rotary ring of circumferentially spaced vertically depended baffle stirrers around and depended from above the distributor downwardly across its zone of distribution, for laterally deflecting through its spaces distributed material in such zone, of my present invention.

Another example of an air separator is shown in my Patent No. 1,876,516 dated September 6, 1932 in which I have shown and claimed a vertically adjustable distributor revolubly suspended from a vertically stationary bearing, as to which it is axially adjusted by vertically stationary rotary adjustment means, requiring stoppage of operation for its adjustment up and down, as distinguished from the vertically movable non-rotary means of my present invention, vertically movable with the distributor during its rotation, for adjusting it up and down during operation; and in my said Patent No. 1,876,516 I have shown and claimed an automatically operated shutoff gate above the separator, and a vertically movable tailings receiver, responsive to variations in the weight of the stream of tailings flowing on to it, and operatively connected to said gate, for automatically varying said gate with variations in the weight of such stream, and a variable speed revoluble blower revolved by a speed reducer operatively connected to said responsive receiver for automatically reducing speed of revolution of said blower with increase in the weight of such stream, and a variable speed revoluble distributor, and a speed reducer operatively connected to it for revolving it and operatively connected to said responsive receiver, for automatically reducing the speed of revolution of said distributor with variations in the weight of said stream, as distinguished from the automatically vertically variable distributor, baffles, internal supply pipe, and other automatically vertically movable internal parts within a separating chamber and connected to and vertically sustained by and automatically vertically moved by such a responsive receiver with variations in the weight of the material flowing on to such a responsive receiver, of my present invention.

Another example of an air separator is shown in my application Serial No. 687,359 filed January 19, 1924, in which I have shown and claimed a vertically adjustable distributor carried by a vertically stationary bearing and vertically adjusted relatively to said bearing by vertically stationary rotary adjustment means revoluble with and as to which said distributor is vertically adjustable, and requiring stoppage of operation for adjusting the distributor up and down, as distinguished from my vertically movable non-rotary bearing for the distributor, vertically movable with it and on which it is revolubly mounted, for vertically adjusting it during its rotation and without stopping operation, of my present invention; and in my said application Serial No. 687,359 I have shown and claimed a variable speed revoluble distributor, and an automatically operated speed accelerator drivingly connected to it, and a vertically movable tailings receiver, responsive to variations in the weight of the stream of tailings flowing on to it, and operatively connected to said accelerator for automatically accelerating speed of revolution of said distributor with increase in such weight, and a variable speed revoluble blower, and an automatically operated speed accelerator operatively connected to said blower for revolving it, and operatively connected to said responsive receiver, for accelerating the speed of revolution of said blower with increase in such weight, as distinguished from the automatically vertically variable distributor, baffles, internal supply pipe, and other automatically vertically variable internal parts within the separating chamber, vertically sustained by and automatically vertically moved by such a responsive receiver for automatically vertically varying such internal parts with variations in such weight, of my present invention.

This application contains subject matter formerly included in my earlier application Serial No. 91 filed January 10, 1925, other subject matter of which has been protected by claims in my said Patent No. 1,834,095 and in my said Patent No. 1,876,516.

My present invention aims to provide improvements especially applicable to separators of this character and aims to facilitate regulation of the vertical point of distribution of feed to them, agitation of the pulverulent material in the path of the current, variation of the relation of the separating elements, and variation of the vertical lift of the current, and control of extraction of over-size pieces from the current before it passes to the outer chamber.

Figure 1:
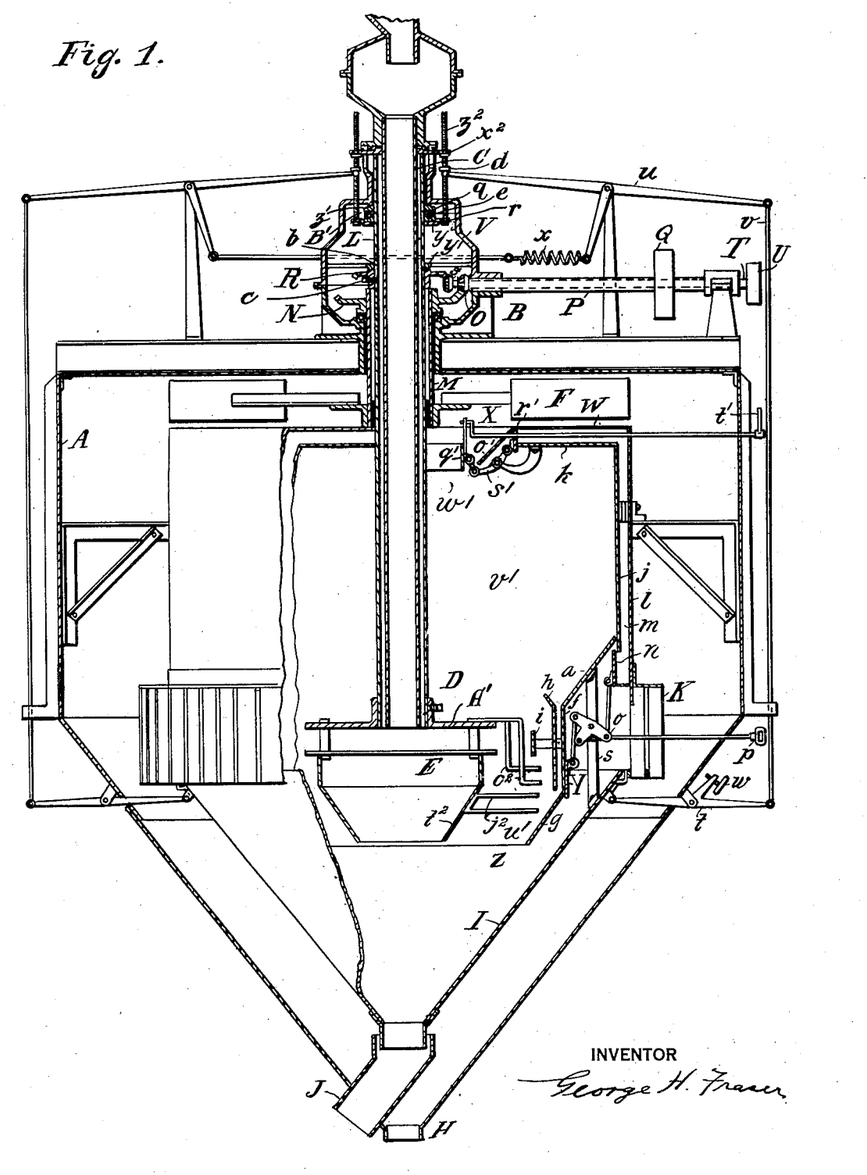
Figure 2:
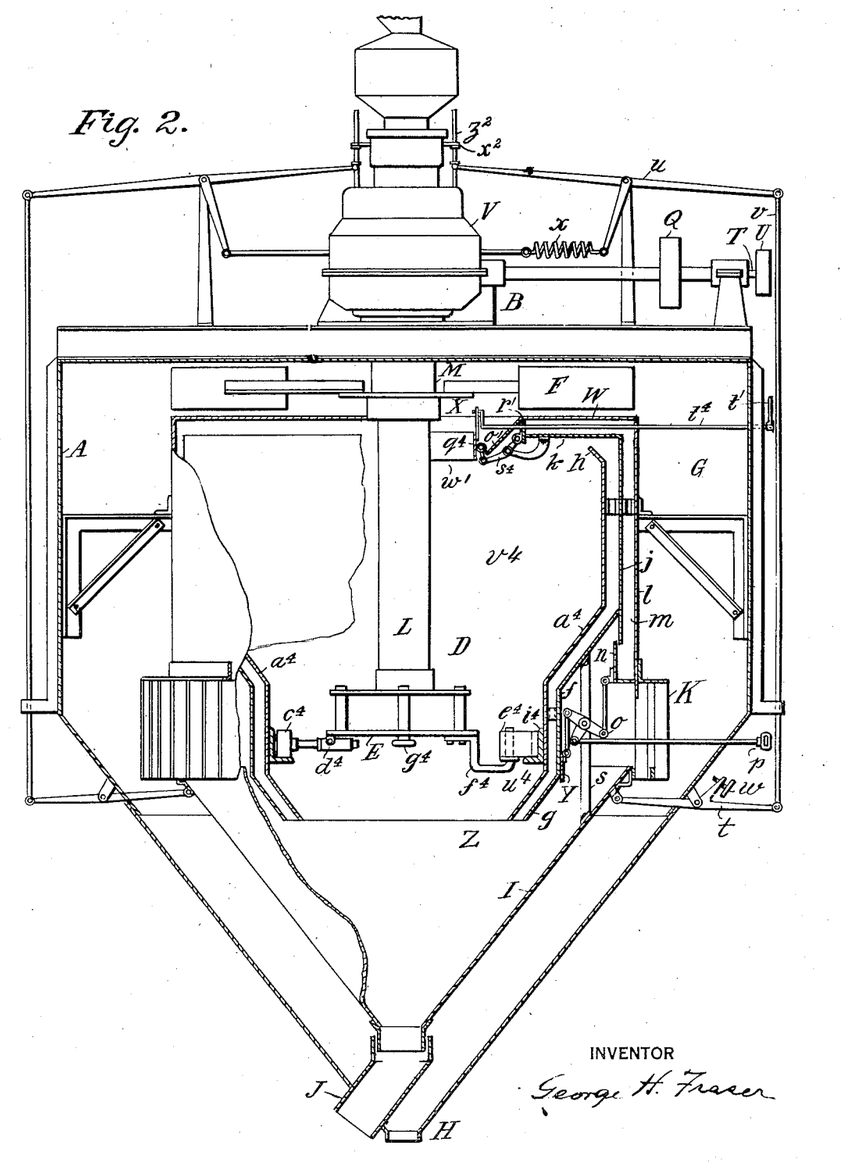

To this end in carrying out the preferred form of my present improvements I provide in operative relation to such a responsive tailings receiver an automatically tailings weight operated and controlled and vertically adjusted distributor for the pulverulent material; and I provide, in operative relation to such a responsive tailings receiver, an automatically tailings weight adjusted tubular and vertically adjustable and preferably non-rotary feed pipe and a tubular distributor shaft surrounding and preferably adjustable with it, and means for preferably simultaneously adjusting these; and I provide, in operative relation to such a responsive tailings receiver, an automatically adjustable baffle or ring around the distributor to intercept centrifugally projected material and cause it to fall vertically, and revolving agitators depending through the horizontally projected film between the distributor and baffle and extending horizontally through the falling cylindrical film below the baffle to stir or beat the material where the current passes through it; and I provide, in operative relation to such a responsive separated material receiver, automatically separated material weight operated means to vary the relative relation of the separating elements and the vertical distance or volume of the spaces through which the current is permitted to pass after it has traversed the film of material to vary the speed and lifting distance of the current to determine the fineness of the particles which it shall carry over and to afford an automatically vertically variable selecting chamber in which larger particles may precipitate, and I provide various other features of improvement all of which will be hereinafter set forth with reference to the accompanying drawings in which Fig. 1 is a vertical axial section of an air separator embodying the preferred form of my present improvements, and Fig. 2 is a vertical axial section similar to Fig. 1 of an air separator embodying a modified form of my improvements and equipped with pulverizing elements, some of the parts being shown partly in elevation.

Referring to Figs. 1 and 2 of the drawings let A indicate the main frame or casing of an air separator, B the driving mechanism therefor, C the feed pipe for material to be separated, D the feed receptacle or inner casing or separating chamber, E the feed distributor therein, F the fan or current means, G the outer or dust chamber, H the dust or fine outlet therefrom, I the tailings conveyor receiver or receptacle, J the contracted tailings or coarse outlet therefrom, K the foraminous filter or current cleaning means surrounding the feed chamber, L the drive shaft for the distributor, M the drive shaft for the fan, N the drive gear for the fan, O its drive pinion, P its drive shaft, Q its drive pulley, R the drive gear for the distributor, S its drive pinion, T its drive shaft, U its drive pulley, and V the gear frame or drive casing of an air separator.

These parts may be of any suitable construction for distributing pulverulent material in the feed chamber and causing a fluid current to rise through it to float fine material into the outer chamber.

As shown the casing A has a flat top, a cylindrical side wall and a conical bottom wall, separably or removably connected, and encloses the settling or dust chamber G in which the feed chamber is mounted concentrically and in spaced relation to the outer wall. The feed chamber has upper and lower openings communicating with the outer chamber to permit air to flow up through the feed chamber and out into the dust chamber and return through the lower opening. The filter is in the path of the returning current of air and intercepts and conducts below the zone of the returning current particles floating therein. The returning current rises through the feed chamber and through the material distributed therein to float fine particles up to and through the upper opening and to permit coarse particles to fall into the tailings chamber. The feed chamber is usually surmounted by an annular fan shelf W surrounding the upper opening X, and the fan revolves in the way between this and the top of the casing A. The distributor is usually a revolving disc for centrifugally projecting the material across the rising air current and is vertically adjustable to vary the plane of distribution to vary the fineness of the material separated by varying the vertical distance between the distributor and the upper opening. A damper such as the damper Y has heretofore been provided by me around the lower opening Z to vary the space through which the returning current may pass to vary the speed of the current for the purpose of modifying its lifting power to vary the fineness of material separated.

One feature of my present invention aims to improve variation of the speed of the air current between the point where it passes through the distributed material and the upper opening, to modify its lifting force and afford a vertically variable selecting chamber in which oversize particles may precipitate, so that only particles light enough to be floated by the modified current will be carried over to the upper outlet, and this I preferably accomplish by automatically vertically varying the volume of the current passage beyond the point of initial separation, to correspondingly vary the speed and lifting power of the current there so that it can automatically select the fineness to be floated over.

I preferably accomplish this by providing a wall or walls within the separating chamber and automatically movable to vary the height of the passage for the dust laden current. These walls may be spaced inner and outer baffle walls above the distributor and below the upper outlet, the inner wall preferably rotary and flat and vertically movable, and the outer wall preferably non-rotary and tapering and vertically movable, to afford an annular space between them through which current may upflow from the distributor, and spaced a variable distance below the upper outlet, to afford a vertically variable space or selection chamber above them, the volume of which may be varied so that the speed of the current in this space can be modified without necessarily modifying the current speed at the point where it traverses the material or at other points.

Another feature provides for permitting uniform speed of the current through the fan and dust chamber and filter and varying its speed through the material and through the succeeding selecting chamber, which I preferably accomplish by a valved by-pass for some of the current from within the filter above and around the feed chamber and selecting chamber, so that the returning current may be apportioned to send the desired quantity through the distributed material and selecting chamber and by-pass the remainder of the current around these back to the fan to suit the requirements of separation and to avoid waste of power by needless throttling of the fan.

Another feature relates to intercepting and dropping the distributed material and agitating it while outflying and while falling, which I preferably accomplish by providing a rotary assembly of circularly arranged circumferentially spaced vertically depended laterally deflective revolving depending stirrers around and spaced from the periphery of the distributor and depended from above it and extended vertically downward from above it past and below it and across the horizontal zone of distribution of material rotatively distributed by it, for intercepting such material and deflecting it laterally and passing it through the circumferential spaces between such stirrers, as distinguished from my previous horizontally extended uptossers extended horizontally from the periphery of the distributor for upwardly impelling distributed material, which vertical stirrers are preferably disposed between the distributor and the adjustable baffle ring $i$, below which they preferably have horizontally extended free ends extending below and across the lower edge of this ring to agitate the material in both its horizontal and vertical blankets to facilitate passage of air through it and make fine particles more accessible to the action of the air.

Another feature aims to improve and facilitate regulation of the vertical plane of distribution of feed of pulverulent material, which I preferably accomplish by rotatively suspending from a vertically variable non-rotative carrier the suspension member of a distributor sustained by and revolving with the drive pipe and vertically adjustable therewith relatively to the separating chamber, which carrier is preferably connected to and automatically vertically varied by such a responsive tailings receiver, for automatically vertically varying said distributor and its suspension member with variations in the weight of the stream of tailings flowing on to said receiver.

Another feature aims to vary the vertical relation of the separating elements and the vertical distance through which the separated material must be lifted, while maintaining uniform relative conditions of the distributor and collateral parts, which I preferably accomplish by making the distributor shaft, distributor disc, baffle walls, tailings receiver, and filter vertically adjustable together to maintain like feed and current conditions at certain points while permitting variation of distance between the distributor and the upper outlet.

I will now describe in detail the preferred embodiment of my present improvement.

Referring especially to Figs. 1 and 2 of the drawings;

The separating chamber D is preferably formed with a top wall K, a rotary and vertically adjustable lower inner baffle wall A', an upwardly and outwardly flaring vertically adjustable or movable lower outer baffle wall $a$ and an upwardly extending preferably cylindrical and stationary enclosing outer wall $j$, above the distributor E and spaced to afford between them an upwardly variable and outwardly extending annular passage for the dust laden air which is passed through the pulverulent material at the point of distribution, affording a variable precipitation chamber $v'$ in which larger particles can fall back, and a vertically variable way through which the air with the remaining smaller particles may flow to the upper opening X. The area of this passage increases as its diameter increases in its upward extension to correspondingly diminish the speed of the air flowing through it, and I preferably provide for varying the height of the selecting chamber this passage affords by moving the walls A' and a relatively to the top wall to vary the space between them and to correspondingly vary the vertical distance to be traveled by the current traversing this space. Preferably the outer wall a has an intermediate cylindrical portion f, spaced from and around the wall A' and enclosing a lower distribution chamber u', surrounding the distributor, and a contracting conical lower portion g surrounding the lower opening Z, and an inner wall h spaced within it to afford a precipitate passage for conducting particles from the precipitation chamber through and below the rising air current opposite the distributor, and an adjustable baffle ring i spaced from it opposite and surrounding the distributor to intercept outflying material and cause it to drop by gravity on to the lower cone g, and preferably all of these walls and the distributor are movable vertically to maintain their relative positions throughout any adjustment of the outer wall a.

The outer wall a preferably slides or moves telescopically within a stationary cylindrical annular wear preventing lining wall j surrounding and connected to a stationary annular wear preventing lining top wall k.

The fan shelf W may constitute the wall k and the wall j may depend from it, but according to the preferred form of my invention I space the fan shelf above the wall k and provide this shelf with the depending cylindrical wall l spaced around the wall j, to afford between these walls a space or passage affording a by-pass m around the separating chamber and through which air may be passed from within the filter K to the upper opening X when it is desired to reduce the current through such a chamber while maintaining the usual volume of current through the fan and filter, so that throttling of the separating current can be effected without correspondingly opposing resistance of the fan or reducing speed through the filter by varying communication through the by-pass in opposition to variation of communication to the lower opening.

Preferably I provide a damper Y around and to travel with the vertical adjustments of the cylindrical wall f and adjustable relatively to it to vary the space above the tailings cone I through which the current may pass, and I provide a relief valve n moved by but in opposition to the valve Y to control or vary the space through which current may flow to the by-pass m. These valves or dampers are preferably carried by the wall a and operated by a lever o which is tilted from without by a handle p. The return of the cleaned air from within the filter to the fan may be apportioned by them between the separating chamber and the by-pass to suit desired results.

I prefer to support the wall a from the tailings cone I by a rod or other suitable connection s and to move the tailings cone, the lower walls of the selection chamber, the distributor E, its stirrers or agitators, and its feed disc and regulating valve, as well as the filter K, together vertically relatively to the blower and fan shelf. This may be done in many ways, but I prefer it to sustain the tailings cone on rocking levers t and the feed parts on rocking levers u connected by a rod v to cause them to swing in unison, and which can be manually or otherwise adjusted from without by a screw wheel w to vary the vertical position or limit the descent of the movable parts. Preferably these levers are counter-balanced by tension springs x to sustain the weight of the parts they carry and facilitate their adjustment.

The shaft L, preferably drivingly and slidingly connected to its gear R, is preferably the rotary and vertically adjustable suspension means for the inner baffle wall A' and the distributor E depended from the latter, and I preferably provide a vertically variable rotary adjuster member z' on the shaft L, and a vertically variable non-rotary adjuster or carrier y, adjustably carried from the outer casing A, for vertically sustaining such suspension means and the dependent parts carried thereby, and for vertically adjusting these during operation, to facilitate variation of the height or volume of the passage through the separating chamber, and to avoid necessity of interrupting operation while effecting such variation, and I preferably antifrictionally revolubly connect such suspension means with the vertically adjustable adjuster y by a vertically variable ball bearing B' preferably comprising a rotatable and vertically variable bearing race q under the member z', revolving on rollable antifriction members e, revolubly sustained by a vertically adjustable non-rotary bearing race r on the adjuster or carrier y, preferably vertically adjustably mounted within the gear case V, and adjusted from without by suspension screws $z^2$, preferably adjustably connected by manually adjustable nuts d to the levers u, and moved by these levers for automatically vertically adjusting the baffle wall A' and the distributor E with variations in the weight of the stream of tailings flowing on to the receiver I.

As shown the drive shaft L for the distributor is sustained by a carrier y, and supported and moved vertically by the upper levers u to vary its position synchronously with variations in position of the lower part of the distributing chamber to maintain uniform relation between them, but the distributor E may be independently adjusted on its shaft to vary its position relative to the lower opening Z, and the baffle i may be similarly adjusted to correspond with such adjustment of the distributor.

The outlet X preferably comprises a stationary downwardly and inwardly tapering grit deflecting depending annular wall flange or lip o' depending from the wall W and affording around such lip the inward passage to the suction side of the fan, and beneath such lip the passage to the by-pass m, which passages are preferably variable by vertical movement of the valves q' and r' hereafter described.

My invention preferably provides a damper q' for varying the outlet passage, and the damper r' for varying the by-pass passage near the fan, and preferably simultaneously reversely operates these by a lever s' connected to and operated with the movement of the crank rod t4 so that as this rises to its highest position the damper $q'$ will reduce outlet of current from the selecting chamber and the damper $r'$ will simultaneously open the by-pass outlet, and these dampers may be manually operated from without in any suitable manner as shown by the handle $t'$.

As thus constructed these walls afford a contracted annular vertical separating passage $u'$ around the distributor, a variable selecting chamber $v'$ above it, and a variable discharge passage $w'$ therefrom to the fan.

In the construction shown the distributor shaft is feathered on its driving gear R which is held in position by a retainer $y'$ so that the shaft may be raised or lowered through the gear but must revolve with it, and the weight of the shaft is sustained by its ball-bearing collar $z'$, see Fig. 1, which is fixed to it.

As shown the distributor shaft L has a slot or keyway $b$ and its drive gear R has a key or screw $c$ entering this slot to feather the shaft to the gear, and the carrier $y$ is a non-rotative vertically adjustable bearing encircling the shaft L for vertically adjusting the shaft and rotatively sustaining it and the distributor in any position of adjustment. The shaft L depends through and is suspended from the carrier $y$, which is preferably located within the gear chamber V and suspended by rods $z2$ extending up through and without this casing and preferably supported and moved by the levers $u$.

As shown the feed pipe $c$ affords a conduit for supplying to the distributor material to be separated, and is within and encircled by and traverses concentrically through the drive pipe L and its gear and bearings, and according to one feature of my present invention the feed pipe is preferably vertically adjusted by the levers $u$ simultaneously with and similarly to the vertical adjustment of the distributor E, to maintain their relative positions as well as being independently adjustable to vary the proximity of the lower end of the pipe to the distributor.

Preferably this is accomplished as shown by mounting the feed pipe by adjustable nuts $x2$ on the rods $z2$ so that the pipe C and the pipe L will both be vertically adjusted by the levers $u$, and the pipe C can be individually adjusted by the nuts $x2$.

In operation with this form of my invention the vertical plane of distribution of pulverulent material is controlled by vertical movement of the weight operated tailings cone I which raises or lowers the distributor disc E. The material falls through the feed pipe on to the distributor E and is thrown therefrom against the baffle $i$. The stirring fingers $c2$ depending from the distributor hub stir the outflying material, and their outwardly bent ends stir the material as it drops by gravity from the baffle. The returning air current rises under the disc and flows outwardly under the baffle as well as upwardly between it and the distributor, and floats fine material up through the separating chamber $u'$ into the selecting chamber $v'$. Larger particles may be thrown out by the deflecting flange $o'$ as the current curls to reach the outlet $w'$ and then will fall back, thus falling on the wall $a$ and being guided through the separating chamber by a lining or wear preventing extractor wall $h$. Particles fine enough to float with the current to the outlet will rise through the passage $w'$ and be drawn through the fan, which will blow the dust laden current into the outer chamber from which it will return through the filter baffles or hollow troughs which will afford current voids in which the dust may descend out of the zone of the current and fall into the dust chamber. Cleaned air getting through the filter will return through the lower opening Z to the separating chamber. To vary fineness of separation the vertical volume of the selecting chamber $v'$ will be varied by adjusting one or all of its walls. When adjusted to contract the volume the current speed will be accelerated to carry coarser material, and when adjusted to increase volume current speed will be modified so that it will only carry finer material to the outlet $w'$. Variation of current incident to such adjustment will be effected by the dampers Y and $n$ to apportion the current going into the separating passage $u'$ relatively to that by passing the separating chamber, or by the dampers $q'$ and $r'$ to apportion the current escaping from the selecting chamber relatively to that escaping through the by-pass.

Thus uniform current through the fan and filter may be maintained without undue back pressure on the fan, while the current to or from the separating chamber can be varied, and the speed of current in the selecting chamber can be varied by varying its volume, and these variations can be accomplished without varying the relation between the distributor and separating chamber.

As thus far described the separating elements and the selecting chamber may be mutually relatively varied to control operation or fineness of separation in any suitable or desired manner, but according to the preferred form of my invention I automatically effect this, preferably by utilizing the weight of the outflowing stream of one of the separated materials and providing varying, controlling, regulating or adjusting means responsive to variations in such weight for varying the vertical plane of distribution of the material to be separated, or the height or volume of the separating or selecting chambers, or the space through which the separating current is permitted to flow with variations in such weight.

This may be accomplished in any suitable manner, but I prefer to use the stream of tailings falling through the tailings out-dropping opening Z from the separating chamber on to the tailings conveying receiver I for such regulation, and to make the receiver I vertically movable and weight operated with variations in such weight and to yieldingly suspend or counter-balance it as by carrying it on the balancing levers or beams $t$ and $u$ and counter-balancing it by any suitable counter-balancing means as the balancing spring $x$, so that it and these levers are responsive to variations in such stream, and to suspend from or vertically movable levers $u$, the feed pipe C, and to revolubly suspend from the levers $u$ the distributor drive pipe L, and the distributor E, and the rotary baffle wall A', and its stirrers, and to mount the movable walls $f$ and $g$ of the separating chamber and the movable bottom wall $a$ of the selecting chamber on the movable receiver I so that they will rise and fall with its movement with variations in the weight of such stream, and to also mount the filter K on the receivers so that it will slide on the outer wall $l$ of the inner casing as the receiver rises and falls.

Thus my invention provides for automatic variation or control of the separating elements with variations in the weight of one of the streams of separated material.

My invention includes a pulverizer for supplying the pulverulent material to be separated, and in that form of my invention I preferably substitute pulverizing elements for the stirrers, mounting crushing rolls below and revolving them with the distributor so that they can act to crush material against a crushing ring which I then substitute for the baffle $i$, disposing these so that the returning air may rise between the crushing elements to float fine material into the expansible selecting chamber, from which the air will be withdrawn past the adjustable outlet valve $q4$ to the outer settling chamber or an outside dust collector from which clean air will be returned to the lower opening Z.

My variable selecting chamber and regulating outlet and by-pass and valves for apportioning the filtered current may be used with any pulverizing elements.

Fig. 2 shows one such modification of the construction illustrated in Fig. 1 corresponding parts bearing the same reference letters of those in that figure. In this construction a flanged crushing ring $i4$ is substituted for the baffle $i$ and receives the material projected from the distributing disc E, and a vertically acting crushing roll $c4$ rolls over the material on the flange of this ring as the roll revolves with the disc the spindle of the roll being rotatably mounted in a swinging bearing $d4$ hinged to the bottom of the disc so that the roll is free to rise as it rolls over such material to pulverize any lumps therein. Diametrically opposite the roll $c4$ a revolving crushing ring $e4$ acts against the vertical leg of the crushing ring to crush material against that leg. The crushing ring $e4$ is free to move radially on its holding pin $f4$ which is fastened beneath the disc E so that the ring is swung around by the disc and acts centrifugally toward the ring $i4$. Intermediate of the roller $c4$ and ring $e4$ a centrifugal swinging crushing hammer $g4$ is hinged beneath the disc E to impactively strike the material on the ring $i4$ to pulverize, stir and dislodge such material.

Such pulverized material falls into the separating passage $u4$ through which the air rises to float the fines into the selecting chamber $v4$ above its bottom inclined wall $a4$ which is vertically variable relatively to the top wall W to reach the upper opening X. The valve $q4$ for varying the opening X is here shown as connected with the bellcrank $s4$ for tilting it when the valve $q4$ is moved by the rod $t4$. In this construction the distributor disc E is not vertically movable relatively to the pulverizing ring $i4$ which rises and descends with it and with the lower wall $a4$ of the separating chamber, and the chamber $u4$ affords an axially or vertically movable crushing chamber, which with the crushing elements, which are also axially or vertically movable, may be axially or vertically varied relatively to the selecting chamber $v4$ and the upper outlet X. This variation is preferably automatically effected by variations in the weight of the stream of either pulverized or unpulverized material, and preferably by variations in the stream of unpulverized tailings out-dropping from the crushing chamber $u4$ on to the uncrushed material conveyor or receiver I, with which the crushing chamber is shown as vertically movable and connected by the rod $s$, which receiver is vertically yielding as by being carried by levers $t$ and balancing beams $u$ and counter-balanced by the spring $x$ as before described, which are responsive to variations in the weight of such stream and automatically vary the pulverizing elements and the pulverizing chamber relatively to the selecting chamber with variations in such weight. If desirable, however, the variable parts may be movably varied by the adjusting screw $w$ and set in any desired position by it, or their variations may be limited by adjusting such screw to effect the desired limitation.

It will be seen that my invention provides improvements that can be variously and advantageously availed of, and it will be understood that these can be used in whole or in part according to such modifications, adaptations or combinations as circumstances or the judgment of those skilled in the art may dictate, and that the invention is not limited to the particular details of construction, arrangement, combination or use set forth as constituting its preferred form, as these can be modified as circumstances or the judgment of those skilled in the art may dictate without departing from the spirit of this invention.

Although for more fully showing the applicability of my present invention I have shown it in Fig. 2 in combination with pulverizing elements, and with reference to said figure have described such combination, such combination is not claimed in the present application, but is claimed in my patent application filed June 15, 1932, Serial No. 617,395.

What I claim is:

1. In combination, a casing enclosing a separating chamber having a lower current inlet and an upper current outlet, supply means for supplying material to be separated to said chamber, a blower for causing a fluid current to enter said chamber through said inlet and flow up through said chamber and through said outlet to separate and float fine material from said chamber, variable means for varying the volume of said chamber to vary the fineness of such separation, and a vertically movable weight operated receiver for receiving such separated material, responsive to variations in the weight of the steam of such separated material flowing on to said receiver, operatively connected to said varying means, for varying such volume with variations in such weight.

2. In combination, a casing enclosing a chamber having a lower current inlet opening and an upper current outlet opening and affording intermediate said openings an upper selecting chamber and a lower separating chamber, supply means for supplying material to be separated to said separating chamber, a blower for causing a fluid current to enter said separating chamber through said lower opening and flow up through said selecting chamber and upper opening to separate and float fine material from said chambers, variable means for varying the volume of said selecting chamber, and a vertically movable weight operated separated material receiver for receiving such separated material, responsive to variations in the weight of the stream of such separated material flowing on to said receiver, operatively connected to said variable means for varying such volume with variations in the weight of such stream.

3. In combination, a casing enclosing a chamber having a lower current inlet opening and an upper current outlet opening and affording intermediate said openings a lower separating chamber and an upper selecting chamber, one variable relatively to the other, supply means for supplying material to be separated to said separating chamber, a blower for causing a fluid current to enter said chamber through said inlet and flow up through said chamber and through said outlet to separate and float fine material from said chambers, variable means for varying said variable chamber, and a vertically movable weight operated separated material receiver for receiving such separated material, responsive to variations in the weight of the stream of such separated material flowing on to said receiver operatively connected to said variable means for varying said variable chamber with variations in the weight of such stream.

4. In combination, a casing enclosing a separating chamber having a lower current inlet opening and an upper current outlet opening, variable internal supply means within and for supplying material to be separated to said separating chamber, a blower for causing a fluid current to enter through said lower opening and flow up through said separating chamber and upper opening to separate and float fine material from said chamber, and a vertically movable weight operated separated material receiver for receiving such separated material, responsive to variations in the weight of the stream of such separated material flowing on to said receiver, operatively connected to said internal supply means for varying said internal supplying means with variations in the weight of such stream.

5. In combination, a casing enclosing a separating chamber having a lower current inlet opening and an upper current outlet opening, vertically variable distributor means for distributing material to be separated within said chamber, a blower for causing a fluid current to enter through said lower opening and flow up through said separating chamber and upper opening to separate and float fine material from said chamber, and a vertically movable weight operated separated material receiver for receiving such separated material, responsive to variations in the weight of the stream of such separated material flowing on to said receiver, operatively connected to said distributor for vertically varying said distributing means with variations in the weight of such stream.

6. In combination, a casing enclosing a separating chamber having a lower current inlet opening and an upper current outlet opening and affording a return current passage communicating between said outlet and said inlet openings, supply means for supplying material to be separated to said separating chamber, a blower for causing a fluid current to enter said chamber through said inlet opening and flow up through said chamber and upper opening and return through said passage to separate and float fine material from said separating chamber, variable valve means for varying the space through which such current is permitted to flow, and a weight operated vertically movable receiver for receiving such separated material, responsive to variations in the weight of such separated material flowing on to said receiver, operatively connected to said valve means for varying said space with variations in the weight of such stream.

7. In combination, a casing enclosing a separating chamber having a lower current inlet opening and an upper current outlet opening and affording a return current passage communicating between said outlet opening and said inlet opening, supply means for supplying material to be separated to said separating chamber, a blower for causing a fluid current to enter said chamber through said inlet opening and flow up through said chamber and upper opening and return through said passage to separate and float fine material from said chamber, variable fine material interceptor means across said passage for intercepting fine material floating in such returning current, and a weight operated vertically movable separated material receiver for receiving such separated material, responsive to variations in the weight of the stream of such separated material flowing on to such receiver operatively connected to said interceptor means for varying said interceptor means with variations in the weight of such stream.

8. In combination, a casing enclosing a separating chamber and having a lower current inlet opening and an upper current outlet opening and affording a return current passage communicating between said outlet opening and said inlet opening, means affording a variable by-pass current passage intermediate said separating chamber and said return current passage for by-passing current between said upper outlet and said lower inlet, supply means for supplying material to be separated to said separating chamber, a blower for causing a fluid current to enter said chamber through said inlet and flow up through said chamber and upper outlet and return through said return passage and through said by-pass passage to separate and float fine material from said chamber, and a weight operated vertically movable separated material receiver for receiving such separated material, responsive to variations in the weight of the stream of such separated material flowing on to said receiver, operatively connected to said by-pass means for varying said by-pass with variations in the weight of such stream.

9. In combination, a casing enclosing a separating chamber having a lower current inlet and an upper current outlet, a variable wall for varying the current space within said chamber, supply means for supplying material to be separated to said chamber, a blower for causing a fluid current to enter said chamber through said inlet and flow up through said chamber and said outlet to separate and float fine material from said chamber, and a weight operated vertically movable separated material receiver for receiving such separated material, responsive to variations in the weight of the stream of such separated material flowing on to said receiver, operatively connected to said variable wall for varying said variable wall with variations in the weight of such stream.

10. In combination, a casing enclosing a separating chamber and having a lower current inlet and an upper current outlet and a vertically movable lower wall, supply means for supplying material to be separated to said chamber, a blower for causing a fluid current to enter said chamber through said inlet and flow up through said chamber and upper outlet to separate and float fine material from said chamber, and a weight operated vertically movable separated material receiver for receiving such separated material, responsive to variations in the weight of the stream of such separated material flowing on to said receiver, operatively connected to said movable wall for varying said movable wall with variations in the weight of such stream.

11. In combination, a casing enclosing a separating chamber and having a current inlet and a current outlet, variable separating elements within said chamber, supply means for supplying material to be separated to said elements, a blower for causing a fluid current to enter said chamber through said inlet and flow up through said chamber and through said outlet to separate and float from said chamber material separated by said elements, and a vertically movable weight operated separated material receiver for receiving such separated material, responsive to variations in the weight of the stream of such separated material flowing on to said receiver, operatively connected to said separating elements for varying said separating elements with variations in the weight of such stream.

12. In combination, a casing enclosing a separating chamber and having a current inlet and a current outlet, supply means for supplying material to be separated to said chamber, variable material beater means in said chamber for beating such material, a blower for causing a fluid current to enter said chamber through said inlet and flow up through said chamber and outlet for separating and floating fine material from said chamber, and a weight operated vertically movable separated material receiver for receiving such separated material, responsive to variations in the weight of the stream of such separated material flowing on to said receiver, operatively connected to said beater means for varying said beater means with variations in the weight of such stream.

13. In combination, a casing enclosing a separating chamber and having a current inlet and a current outlet, a vertically movable supply conduit within, and vertically variable within, said chamber, for supplying material to be separated to said chamber, a blower for causing a fluid current to enter said chamber through said inlet and flow up through said chamber and outlet to separate and float fine material from said chamber, and a weight operated vertically movable separated material receiver for receiving such separated material, responsive to variations in the weight of the stream of such separated material flowing on to said receiver, operatively connected to said conduit for vertically varying said conduit with variations in the weight of such stream.

14. In combination, a casing enclosing a separating chamber and having a current inlet and a current outlet, vertically variable revolving distributor means for distributing material to be separated in said chamber, a blower for causing a fluid current to enter said chamber through said inlet and flow up through said chamber and outlet to separate and float fine material from said chamber, vertically variable bearing means for vertically positioning said distributor means, and a weight operated vertically movable separated material receiver for receiving such separated material, responsive to variations in the weight of the stream of such separated material flowing on to said receiver, operatively connected to said bearing means for varying said bearing means with variations in the weight of such stream.

15. In combination, a casing enclosing a separating chamber and having a current inlet and a current outlet, vertically adjustable rotary distributor means for supplying material to be separated to said chamber, vertically adjustable shaft means for revolving said distributing means, drive means for revolving said shaft means, a blower for causing a fluid current to enter said chamber through said inlet and flow up through said chamber and through said outlet to separate and float fine material from said chamber, and a weight operated vertically movable separated material receiver for receiving such separated material, responsive to variations in the weight of the stream of such separated material flowing on to said receiver, operatively connected to said shaft means for vertically adjusting said shaft means with variations in the weight of such stream.

16. A separator for separating fine material and discharging coarser material as tailings, comprising a casing enclosing a separating chamber having an upper current outlet, and a lower current inlet, a blower in communication with said chamber for causing a fluid current to flow through said inlet and up through said chamber and through said outlet, for separating and floating fine material from said chamber, a rotatable and upwardly and downwardly vertically movable distributor within said chamber, rotatable for rotatably supplying material to be separated to said current, and vertically movable during such rotation, for vertically varying such supply, for varying such separation, and rotary drive means in operative relation to said distributor, for rotating said distributor, in combination with upwardly and downwardly movable suspension bearing means for said distributor, above and revolubly connected to said distributor for revolubly suspending said distributor, in operative relation to and movable upwardly and downwardly with said distributor and relatively to said casing during rotation of said distributor, for upwardly and downwardly moving said distributor relatively to said casing during such rotation, and for revolubly suspending said distributor during such rotation and movement.

17. A separator for separating fine material and discharging coarser material as tailings, comprising a casing enclosing a separating chamber having an upper current outlet and a lower current inlet, a blower in communication with said chamber for causing a fluid current to flow through said inlet and up through said chamber and through said outlet, for separating and floating fine material from said chamber, a distributor within said chamber for supplying material to be separated to such current, a rotatable and vertically movable baffle wall within said chamber and above said distributor, for defining the space through which such current is permitted to flow, and vertically movable for vertically varying such space, for varying such separation, and rotary drive means drivingly connected to said baffle wall, in combination with upwardly and downwardly movable suspension bearing means for said baffle wall, above and revolubly connected to said baffle wall, for revolubly suspending said baffle wall, in operative relation to said baffle wall and movable upwardly and downwardly with said baffle wall and relatively to said casing during such rotation and movement of said baffle wall, for upwardly and downwardly moving said baffle wall relatively to said casing, and for revolubly suspending said baffle wall during such movement and such rotation.

18. A separator for separating fine material and discharging coarser material as tailings, comprising a casing enclosing a separating chamber having an upper current outlet, and a lower current inlet, a blower in communication with said chamber for causing a fluid current to flow through said inlet and up through said chamber and through said outlet, for separating and floating fine material from said chamber, a rotatable and vertically slidable distributor within said chamber, rotatable for rotatably supplying material to be separated to such current, and vertically slidable for vertically varying such supply, for varying such separation, and rotary drive means in operative relation to such distributor, for rotating said distributor, in combination with upwardly and downwardly slidable bearing means for said distributor, revolubly connected to said distributor, for revolubly sustaining said distributor, in operative relation to and upwardly and downwardly slidable with said distributor and relatively to said casing during rotation of said distributor, for upwardly and downwardly sliding said distributor relatively to said chamber and with said bearing means, and for revolubly sustaining said distributor during such sliding and such rotation.

19. A separator for separating fine material and discharging coarser material as tailings, comprising a casing enclosing a separating chamber having an upper current outlet and a lower current inlet, a blower in communication with said chamber for causing a fluid current to flow through said inlet and up through said chamber and through said outlet for separating and floating fine material from said chamber, a distributor within said chamber for supplying material to be separated to such current, a rotatable and upwardly and downwardly slidable baffle wall within said chamber and above said distributor, for defining the space through which such current is permitted to flow, and vertically slidable during its rotation for varying such space during such rotation, for varying such separation, and rotary drive means drivingly connected to such baffle wall for rotating said baffle wall, in combination with upwardly and downwardly slidable bearing means for said baffle wall, revolubly connected to said baffle wall, for revolubly sustaining said baffle wall, in operative relation to and upwardly and downwardly slidable with said baffle wall and relatively to said casing during rotation of said baffle wall, for revolubly sustaining and for upwardly and downwardly sliding said baffle wall, with said bearing means and relatively to said casing, during such rotation and sliding of said baffle wall.

20. In combination, a casing enclosing a separating chamber and having a current inlet and a current outlet, supply means for supplying material to be separated to said chamber, a blower for causing a fluid current to enter said chamber through said inlet and flow up through said chamber and said outlet for separating and floating fine material from said chamber, and discharging coarser material as tailings, means varying the volume of said chamber, and a weight operated movable tailings receiver for receiving such tailings, responsive to variations in the weight of the stream of such tailings flowing on to said receiver, operatively connected to said varying means for varying said varying means with variations in the weight of such stream.

21. In combination, a casing enclosing a separating chamber having a current inlet and a current outlet, supply means for supplying material to be separated to said chamber, a blower for causing a fluid current to enter said chamber through said inlet and flow up through said chamber and said outlet for separating and floating fine material from said chamber and discharging coarser material as tailings, vertically movable means for varying the volume of said chamber, and a tailings weight operated movable tailings receiver for receiving such tailings, responsive to variations in the weight of the stream of such tailings flowing on to said receiver, operatively connected to said varying means for vertically moving said varying means with variations in the weight of such stream.

22. In combination, a casing enclosing a chamber having a lower inlet opening and an upper outlet opening and affording intermediate such openings a lower separating chamber and an upper selecting chamber one variable relatively to the other, supply means for supplying material to be separated to said separating chamber, a blower for causing a fluid current to enter through said lower opening and flow up through said chamber and upper opening to separate and float fine material from said chamber and discharge coarser material as tailings, means for varying such variable chamber, and a tailings weight operated movable tailings receiver for receiving such tailings, responsive to variations in the weight of the stream of such tailings flowing on to said receiver, operatively connected to said varying means for varying said variable chamber with variations in the weight of such stream.

23. In combination, a casing enclosing a separating chamber and having a lower current inlet and an upper current outlet, variable supply means within said chamber for supplying material to be separated to said chamber, a blower for causing a fluid current to enter said inlet and flow up through said chamber and outlet to separate and float fine material from said chamber and discharging coarser material as tailings, and a weight operated movable tailings receiver for receiving such tailings, responsive to variations in the weight of the stream of tailings flowing on to said receiver connected to said supply means for varying said internal supplying means with variations in the weight of such stream.

24. In combination, a casing enclosing a separating chamber and having a lower current inlet and an upper current outlet, vertically variable distributor means within and for distributing material to be separated in said chamber, a blower for causing a fluid current to enter through said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to said receiver, operatively connected to said distributor means for vertically varying said distributing means with variations in the weight of such stream.

25. In combination, a casing enclosing a separating chamber and having a lower current inlet and an upper current outlet and affording a variable return current passage communicating between said outlet and said inlet, supply means for supplying material to be separated to said chamber, a blower for causing a fluid current to enter said chamber through said inlet and flow up through said chamber and said outlet and return through said passage to separate and float fine material from said chamber and discharge coarser material as tailings, valve means for varying the space through which current is permitted to pass through said return passage, and a tailings weight operated movable tailings receiver responsive to variations in the weight of the stream of such tailings flowing on to such receiver, operatively connected to said valve means for varying said valve means with variations in the weight of such stream.

26. In combination, a casing enclosing a separating chamber and having a lower current inlet and an upper current outlet and affording a return current passage communicating between said outlet and said inlet, supply means for supplying material to be separated to said chamber, a blower for causing a fluid current to enter through said inlet and flow up through said chamber and upper outlet and return through said passage for separating and floating fine material from said chamber and discharging coarser material as tailings, variable fine material interceptor means across said passage for intercepting fine material floating in such returning current, and a tailings weight operated movable tailings receiver for receiving such tailings, responsive to the weight of the stream of such tailings flowing on to said receiver, operatively connected to said interceptor means for varying said interceptor means with variations in the weight of such stream.

27. In combination, a casing enclosing a separating chamber and having a lower current inlet and an upper current outlet and affording a current by-pass communicating between said outlet and said inlet, supply means for supplying material to be separated to said chamber, a blower for causing a fluid current to enter said inlet and flow up through said chamber and outlet and return around said chamber and through said by-pass to said inlet to separate and float fine material from said chamber and discharge coarser material as tailings, valve means for varying the space through which such current is permitted to flow through said by-pass, and a tailings weight operated movable tailings receiver for receiving such tailings, responsive to variations in the weight of the stream of such tailings flowing on to such receiver, operatively connected to said valve means for varying such space with variations in the weight of such stream.

28. In combination, a casing enclosing a separating chamber and having a lower current inlet and an upper current outlet and a vertically variable wall for varying the space within said chamber, supply means for supplying material to be separated to said chamber, a blower for causing a fluid current to enter said chamber through said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to said receiver, operatively connected to said wall for varying said wall with variations in the weight of such stream.

29. In combination, a casing enclosing a separating chamber and having a lower current inlet and an upper current outlet and a vertically movable lower wall, supply means for supplying material to be separated to said chamber, a blower for causing a fluid current to enter through said inlet and flow up through said chamber and through said outlet to separate and float fine material from said chamber and discharge coarser material as tailings, and a tailings weight operated movable tailings receiver for receiving such tailings, responsive to variations in the weight of the stream of such receiver, operatively connected to said wall for moving said wall with variations in the weight of such stream.

30. In combination, a casing enclosing a chamber and having a current inlet and a current outlet, variable separating elements in said chamber, supply means for supplying material to be separated to said elements, a blower for causing a fluid current to enter said chamber through said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to such receiver, operatively connected to said elements for varying said elements with variations in the weight of such stream.

31. In combination, a casing enclosing a separating chamber and having a current inlet and a current outlet, supply means for supplying material to be separated to said chamber, variable material beater means in said chamber for beating such material, a blower for causing a fluid current to enter through said inlet and flow up through said chamber and outlet to separate and float fine material from said chamber, and discharge coarser material as tailings, and a tailings weight operated movable tailings receiver for receiving such tailings, responsive to variations in the weight of the stream of such tailings flowing on to said receiver, operatively connected to said beater means for varying said beater means for variations in the weight of such stream.

32. In combination, a casing enclosing a separating chamber and having a current inlet and a current outlet, a vertically movable supply conduit within, and vertically movable within, said chamber for supplying material to be separated to said chamber, a blower for causing a fluid current to enter said chamber through said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to said receiver, operatively connected to said conduit for varying said conduit with variations in such weight.

33. In combination, a casing enclosing a separating chamber and having a current inlet and a current outlet, vertically variable revolving distributor means within and for distributing material to be separated in said chamber, a blower for causing a fluid current to enter said inlet and flow up through said chamber and outlet for separating and floating fine material in said chamber and discharging coarser material as tailings, and a tailings weight operated movable tailings receiver for receiving such tailings, responsive to variations in the weight of the stream of such tailings flowing on to said receiver, operatively connected to said distributor for varying said distributor with variations in the weight of such stream.

34. In combination, a casing enclosing a separating chamber and having a current inlet and a current outlet, vertically adjustable revolving distributor means for distributing material to be separated in said chamber, vertically adjustable shaft means for revolving said distributing means, a blower for causing a fluid current to enter through said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to such receiver, operatively connected to said shaft means for vertically varying said shaft means with variations in the weight of such stream.

35. In combination, a casing enclosing a separating chamber and having a current inlet and a current outlet, vertically movable rotary distributor means for supplying material to be separated in said chamber, vertically movable revolving shaft means for vertically positioning and revolving said distributing means, drive means for driving said shaft means, vertically movable bearing means for sustaining said shaft means, a blower for causing a fluid current to enter said inlet and flow up through said chamber and outlet to separate and float fine material from said chamber and discharge coarser material as tailings, and a tailings weight operated movable tailings receiver for receiving such tailings, responsive to variations in the weight of the stream of such tailings flowing on to said receiver, operatively connected to said bearing means for vertically varying said bearing means with variations in the weight of such stream.

36. A separator comprising a casing enclosing a chamber and having a current inlet and a current outlet and a current passage communicating between said inlet and said outlet, a rotary blower for causing a fluid current to flow through said inlet and said passage to said outlet, for separating and floating fine material from said chamber, a rotatable and vertically reciprocatory distributor within said chamber, rotatable for rotatively supplying material to be separated to such current, and vertically reciprocatory during such rotation for vertically varying such supply during such rotation, for varying such separation, and rotary drive means drivingly connected to said distributor, for rotating said distributor, in combination with upwardly and downwardly reciprocatory bearing means for said distributor, above and revolubly connected to said distributor, for revolubly sustaining said distributor, in operative relation to and upwardly and downwardly reciprocatory with said distributor and relatively to said casing during rotation of said distributor, for upwardly and downwardly reciprocating said distributor during such rotation, and for revolubly suspending said distributor during such reciprocation.

37. A separator comprising a casing enclosing a chamber and having a current inlet and a current outlet and a current passage communicating between said inlet and said outlet, a rotary blower for causing a fluid current to flow through said inlet and said passage to said outlet, for separating and floating fine material from said chamber, a distributor within said chamber for supplying material to be separated to such current, a rotatable and upwardly and downwardly reciprocatory baffle wall within said chamber and above said distributor, for defining the space through which such current is permitted to flow, and vertically reciprocatory during its rotation, for varying such space during such rotation, for varying such separation, and rotary drive means drivingly connected to said baffle wall, for rotating said baffle wall in combination with upwardly and downwardly reciprocatory bearing means for said baffle wall, above and revolubly connected to said baffle wall, for revolubly suspending said baffle wall, in operative relation to and upwardly and downwardly reciprocatory with said baffle wall and relatively to said casing during rotation of said baffle wall, for upwardly and downwardly reciprocating said baffle wall during its rotation and for revolubly suspending said baffle wall during such reciprocation and rotation.

38. A separator comprising a casing enclosing a chamber and having a current inlet and a current outlet and a separating chamber, a blower in communication with said chamber for causing a fluid current to flow through said inlet and up through said chamber and through said outlet, for separating and floating fine material through said chamber, a rotatable and upwardly and downwardly movable distributor within said chamber, rotatable for rotatably supplying material to be separated in such current, and upwardly and downwardly movable during such rotation, for vertically varying such supply, for varying such separation, and rotary drive means drivingly connected to said distributor, for rotating said distributor, in combination with upwardly and downwardly movable axial thrust bearing means for said distributor, for axially sustaining said distributor, in operative relation to said distributor and movable upwardly and downwardly with said distributor and relatively to said chamber during rotation of said distributor, for upwardly and downwardly moving said distributor relatively to said chamber during such rotation, and an upwardly and downwardly movable sustainer lever for said bearing means, revolubly connected to said bearing means for revolubly sustaining said bearing means, and upwardly and downwardly movable with said bearing means and relatively to said casing during such rotation and movement of said distributor, for upwardly and downwardly moving said bearing means and said distributor during such rotation and for revolubly sustaining said bearing means and said distributor during such rotation and such movement.

39. A separator comprising a casing enclosing a chamber, and having a current inlet and a current outlet and a separating chamber, a blower in communication with said chamber for causing a fluid current to flow through said inlet and up through said chamber and through said outlet, for separating and floating fine material from said chamber, a distributor within said chamber for supplying material to be separated to such current, a rotatable and upwardly and downwardly movable baffle wall within said chamber and above said distributor, for refining the space through which such current is permitted to flow, and upwardly and downwardly movable during its rotation for varying such space during such rotation for varying such separation during such rotation, and rotary drive means drivingly connected to said baffle wall, for rotating said baffle wall, in combination with upwardly and downwardly movable axial thrust bearing means for said baffle wall, in operative relation to said baffle wall and movable upwardly and downwardly with said baffle wall and relatively to said casing during rotation of said baffle wall, for axially sustaining and upwardly and downwardly moving said baffle wall during such rotation, and an upwardly and downwardly movable sustainer lever for said bearing means, revolubly connected to and upwardly and downwardly movable with said bearing means and relatively to said casing during such rotation and movement of said baffle wall, for upwardly and downwardly moving said bearing means and said baffle wall, and for revolubly sustaining said bearing means during such rotation and such movement.

40. A separator comprising a casing enclosing a chamber, a receptacle in said chamber having upper and lower openings communicating therewith, a rotary blower for causing a fluid current to flow through and around said receptacle, for separating and floating fine material from said receptacle, a rotary distributor within said receptacle, a rotatable and upwardly and downwardly vertically movable distributor within said receptacle for rotatably supplying material to be separated to such current, and vertically movable during such rotation for vertically varying such supply, for varying such separation, and rotary drive means in operative relation to said distributor, for rotating said distributor, in combination with upwardly and downwardly movable suspension bearing means for said distributor, above and in operative relation to and movable upwardly and downwardly with said distributor and relatively to said receptacle during rotation of said distributor, for upwardly and downwardly moving said distributor relatively to said receptacle during such rotation, and for revolubly suspending said distributor during its rotation and movement, and non-rotary upwardly and downwardly adjustable sustainer means for said bearing means, revolubly connected to said bearing means for revolubly sustaining said bearing means, in operative relation to and upwardly and downwardly movable with said bearing means and relatively to said receptacle during rotation of said distributor, for upwardly and downwardly moving said bearing means and said distributor relatively to said casing during such rotation and movement, and for revolubly sustaining said bearing means during such rotation and upward and downward movement of the latter.

41. In combination, a casing enclosing a chamber, a receptacle mounted in said chamber and having upper and lower openings communicating therewith, a blower for causing a fluid current to flow through said receptacle and upper opening and return through said lower openings, for separating fine material in said receptacle and floating fine material into said chamber, a rotary distributor in said receptacle, for supplying and rotatively distributing in a horizontal zone material to be separated in said receptacle, and a circular series of circumferentially spaced vertically depended laterally deflective baffles within said receptacle and around and spaced from said distributor, depended from above said distributor and extended substantially vertically from above said distributor past and below said distributor and across the horizontal zone of such distribution, for intercepting such distributed material, and for laterally diverting it, and for passing such diverted material through the circumferential spaces between said baffles, for facilitating such separation during such rotative distribution of such material.

42. In combination, a casing enclosing a chamber, a receptacle mounted in said chamber and having upper and lower openings communicating therewith, a blower for causing a fluid current to flow through said receptacle and upper opening into said chamber and return through said lower opening, for separating fine material in said receptacle and floating fine material into said chamber, a rotary distributor within said receptacle, for supplying material to be separated in said receptacle and for rotatively distributing such material in a horizontal zone in such current, and a rotary assembly of annularly arranged circumferentially spaced substantially vertically depended horizontally deflective stirrers around and spaced from and depended from above said distributor, and extended substantially vertically from above past and below said distributor and substantially vertically across the zone of such distribution, and rotatable through the zone of such distribution, for intercepting and stirring such distributed material and for laterally deflecting such stirred material through the circumferential spaces between said vertically depended stirrers during such distribution, for facilitating such separation during such distribution.

43. A separator comprising a casing enclosing a separating chamber having a lower current inlet and an upper current outlet, a blower in communication with said chamber for causing a fluid current to flow through said inlet and up through said outlet, for separating and floating fine material from said chamber, a distributor within said chamber for supplying material to be separated to such current, a rotary and upwardly and downwardly movable baffle wall within said chamber and above said distributor, for defining the space through which such current is permitted to flow, and upwardly and downwardly movable, for vertically varying such space, for varying such separation, and rotary drive means drivingly connected to said baffle wall, for rotating said baffle wall, in combination with upwardly and downwardly movable suspension bearing means for said baffle wall, above and in operative relation to and movable upwardly and downwardly with said baffle wall and relatively to said casing during rotation of said baffle wall, for upwardly and downwardly moving said baffle wall during such rotation, and non-rotary upwardly and downwardly adjustable sustainer means for said bearing means, in operative relation to and movable upwardly and downwardly with said bearing means during such rotation and movement of said bearing means, and revolubly connected to said bearing means for revolubly sustaining said bearing means during such rotation and upward and downward movement, for revolubly sustaining said baffle wall during such rotation and movement.

44. A separator comprising a casing enclosing a separating chamber and having a lower current inlet and an upper current outlet, a blower in communication with said chamber for causing a fluid current to flow through said inlet and up through said outlet, for separating and floating fine material from said chamber, a rotary and upwardly and downwardly movable distributor within said chamber, rotatable for rotatably supplying material to be separated to such current, and upwardly and downwardly movable for vertically varying such separation, and rotary drive means drivingly connected to said distributor, for rotating said distributor, in combination with upwardly and downwardly movable suspension bearing means for said distributor above and revolubly connected to said distributor, for revolubly suspending said distributor, in operative relation to and movable upwardly and downwardly with said distributor and relatively to said chamber during such rotation and movement of said distributor, for upwardly and downwardly moving said distributor during such rotation, and for revolubly suspending said distributor during such rotation and upward and downward movement, and upwardly and downwardly screwable sustainer means for said bearing means, for sustaining said bearing means, in operative relation to and movable upwardly and downwardly with said bearing means and relatively to said casing during rotation of said distributor, for upwardly and downwardly moving said bearing means, upwardly and downwardly screwable relatively to said chamber during rotation of said bearing means, for upwardly and downwardly moving said bearing means during such rotation, and revolubly connected to said bearing means for revolubly sustaining said bearing means and said distributor during such rotation and movement of the latter.

45. A separator comprising a casing enclosing a separating chamber and having a lower current inlet and an upper current outlet, a blower in communication with said chamber for causing a fluid current to flow through said inlet and up through said chamber and through said outlet, for separating and floating fine material from said chamber, a distributor within said chamber, for supplying material to be separated to such current, a rotatable and upwardly and downwardly movable baffle wall within said chamber and above said distributor, for defining the space through which such current is permitted to flow, and upwardly and downwardly movable during rotation for vertically varying such space, for varying such separation, and rotary drive means drivingly connected to said baffle wall, for rotating said baffle wall, in combination with upwardly and downwardly movable suspension bearing means above said baffle wall for suspending said baffle wall, in operative relation to and movable upwardly and downwardly with said baffle wall and relatively to said casing during rotation of said baffle wall, for upwardly and downwardly moving said baffle wall relatively to said casing during such rotation, and upwardly and downwardly screwable sustainer means for said bearing means, in operative relation to and upwardly and downwardly movable with said bearing means during such rotation and movement of said baffle wall, and upwardly and downwardly screwable relatively to said chamber during such rotation of said baffle wall, for upwardly and downwardly moving said bearing means during such rotation and movement, revolubly connected to said bearing means, for revolubly sustaining said bearing means during such rotation and upward and downward movement of said bearing means and said baffle wall.

GEORGE H. FRASER.